US 7,032,021 B1

(12) United States Patent
Froeschl et al.

(10) Patent No.: US 7,032,021 B1
(45) Date of Patent: Apr. 18, 2006

(54) METHOD AND NETWORK ELEMENT FOR OPERATING A TELECOMMUNICATIONS NETWORK

(75) Inventors: Maria Froeschl, Ottobrunn (DE); Matthias Neuhaus, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/936,544

(22) PCT Filed: Mar. 9, 2000

(86) PCT No.: PCT/EP00/02070

§ 371 (c)(1),
(2), (4) Date: Feb. 12, 2002

(87) PCT Pub. No.: WO00/54520

PCT Pub. Date: Sep. 14, 2000

(30) Foreign Application Priority Data

Mar. 10, 1999 (EP) ................................ 99104749

(51) Int. Cl.
*G06F 15/173* (2006.01)
*G06F 3/00* (2006.01)

(52) U.S. Cl. ...................... 709/224; 719/315; 719/316; 709/223

(58) Field of Classification Search ............... 709/223, 709/224; 719/316, 315; 707/1
See application file for complete search history.

(56) References Cited

U.S. PATENT DOCUMENTS

| | | | | |
|---|---|---|---|---|
| 5,623,661 A | * | 4/1997 | Hon | ............................... 707/1 |
| 5,812,779 A | * | 9/1998 | Ciscon et al. | ............... 709/223 |
| 6,233,610 B1 | * | 5/2001 | Hayball et al. | ............. 709/223 |
| 6,363,421 B1 | * | 3/2002 | Barker et al. | ............... 709/223 |
| 6,449,660 B1 | * | 9/2002 | Berg et al. | ...................... 710/1 |
| 6,715,148 B1 | * | 3/2004 | Endicott et al. | ............ 719/316 |
| 6,757,747 B1 | * | 6/2004 | Hooper | ....................... 719/316 |

FOREIGN PATENT DOCUMENTS

EP          0 817 422 A2      1/1998

OTHER PUBLICATIONS

PHAMOS—Philips Advanced Management and Operations System—Functionality and architecture Hermann et al.
Service Designa nd Inventory System—An Object Oriented Reusable Software Asset, Bergholm et al.
CCITT X.720 Information Technology—Open Systems Interconnectin—Structure of Management Information: Management Information Model.

* cited by examiner

*Primary Examiner*—David Wiley
*Assistant Examiner*—Michael Delgado
(74) *Attorney, Agent, or Firm*—Bell, Boyd & Lloyd LLC

(57) ABSTRACT

A method for operating a telecommunications network is explained. A network element (16) at a network node of the telecommunications network is controlled by a control computer (36). The control computer (16) is maintained from a service computer (24). Allomorphy is taken into account in the development of application programs (102, 104) so that even a service computer (24) which is not developed can maintain the control computer (36). Making allowance for allomorphy results in little additional expenditure because an interface program (100) is used in which essential processing steps are carried out for all the application programs (102, 104), said processing steps ensuring that allomorphy is taken into consideration.

16 Claims, 5 Drawing Sheets a)

b)

METHOD AND NETWORK ELEMENT FOR OPERATING A TELECOMMUNICATIONS NETWORK

BACKGROUND OF THE INVENTION

The present invention relates to a method for operating a telecommunications network, in which a network element at a network node of the telecommunications network is controlled by a control computer. The network element is, for example, a switching office for switching links, what is referred to as a cross-connector or a concentrator unit for connecting a number of subscribers to a connecting line. In addition to the operating system for operating the control computer, a number of application programs, during whose execution application objects are processed, are stored in the control computer. The application objects are associated with data with a predefined data structure and preferably also predefined methods for processing the data. The data structure and the methods are dependent on a class which is also to be specified when the respective application object is generated. A link via which the control computer is maintained via maintenance messages is set up between a service computer and a control computer.

Such methods are used for controlling the telecommunications network if, for example, a new switching device is to be put into operation as a network element or if subscriber data in the switching device have to be changed at a later date, such as is the case when new subscribers are connected or when an existing subscriber moves. Efficient methods for controlling the telecommunications network are obtained if what are referred to as open systems are used which are programmed in compliance with standards which apply worldwide. For example, standards of the ISO (International Standardization Organization) and of the ITU (International Telecommunication Union) with its body the ITU-T, known earlier as the CCITT (International Telegraph and Telephone Consultative Committee) relate to the setting up of such open systems. A separate control network is to be used to control the telecommunications network. The interfaces between the service computer and switching device are standardized in protocols Q1, Q2 and Q3.

The application objects are defined as objects of an object-oriented language, for example in the language C++ or CHILL. If the application programs are developed, it is necessary to ensure that the control network also operates without faults with the new application programs. As such, in particular, application objects which are considered by the service computer as belonging to an original class cannot readily be assigned to an amended alternative class.

This problem is mentioned in the CCITT standard X.720 (01/92)—"Information Technology—Open Systems Interconnection—Structure of Management Information: Management Information Model"—in the section 5.2.1. In the section 5.2.3 of the standard X.720, two methods for solving the problem are proposed. In the first method, on the part of the application program, a programming technique is used which takes allomorphy into consideration. Allomorphy is the ability of a specific application object of the alternative class to be controlled as if it were an object of the original class if this ability arises as a result of measures on the part of the application program. The other method includes taking measures on the part of the service computer which permit cooperation between the service computer and the application program even when the application program is developed.

European patent application EP-A-0 817 422 discloses a method for implementing controlled objects in a subsystem of a controlled system in a network, at least one control system and one controlled system being present. The controlled objects are implemented independently of other subsystems without knowing the type of the objects in the other subsystems. They can be connected to other objects and can transmit messages to them. For this purpose, a first object is generated for cooperating with an abstract object. The abstract object has a defined interface which is called up using the first object and which inherits the abstract object from a second object, the generated second object being unknown to the first, and the second object being intended for cooperation with the first object. The first object which cooperates with the second object considers the second object as an object of the abstract type. However, in this method known from EP-A-0 817 422, there is no use of programming technology which takes into consideration the allomorphy in accordance with the section 5.2.3 of the standard X.720.

An object of the present invention, therefore, is to provide a simple method for operating a telecommunications network in which allomorphy is taken into consideration.

SUMMARY OF THE INVENTION

In the method according to the present invention, in each case a class identifier in which the class to which the maintenance message relates is specified is determined from the maintenance messages during the processing of an interface program which is used for a number of application programs. The class identifier in the maintenance message specifies the class, known in the service computer, of an application object to be processed. As a result of the development, the class known in the service computer sometimes deviates from the actual class of the application object. When the interface program is processed, an alternative identifier is determined by reference to the class identifier, the alternative identifier specifying an alternative class to which the application object in the network element is assigned. The alternative identifier is incorporated into an amended maintenance message. When the amended maintenance message is processed by an application program, the application object is then processed as belonging to the alternative class. This is possible because the application object is allomorphous with respect to the class which is known in the service computer and which is required for the application object in the unamended maintenance message by the service computer.

The interface program performs the assignment of the alternative identifiers to the class identifiers centrally for a number of application programs. In the method according to the present invention, this step does not have to be programmed in each application program, but rather only once in the interface program. Given several hundred application programs per control computer, this reduces the complexity of programming, maintenance and documentation considerably. The application programs are kept free of additional steps which are necessary when taking allomorphy into consideration because these steps are carried out centrally in the interface program which is situated upstream.

Some of the additional steps are also carried out in databases which are situated downstream and which are utilized by the application programs.

The execution of the assignment of alternative identifiers and auxiliary identifiers in a central interface program is possible because allomorphy is defined at the class level in the method according to the present invention. Such a definition is not mentioned in the standard X.720, but is nevertheless compatible with the standard. Allomorphy at the class level refers to means that all the objects of the alternative class being carried out as if they were objects of the original class. A definition of allomorphy which is referred to all the objects of the alternative class then does not result in any disadvantages if predefined programming rules are complied with. Examples of such programming rules are explained below in relation to the exemplary embodiments.

The method according to the present invention makes it possible to comply easily with the stipulations of the standard X.720. The application programs in the control computer can be developed with a small amount of additional expenditure, in which case it is always ensured that no errors occur when the control network is operated even when programs remain unchanged in the service computer.

In one embodiment, a table with which the alternative identifiers are assigned to the class identifier is used in the interface program. The table is stored in the memory of the control computer. An entry in the table is read in that a memory cell which is assigned to the class identifier and contains the alternative identifier belonging to the class identifier is read. To determine the alternative identifier, all that is therefore required is a single read access to the memory. If the alternative identifiers change as a result of developments of the application programs, all that is necessary is to reprogram the memory contents. As such, the contents of the table can be easily replaced or expanded.

If, in another embodiment, after the amended maintenance message has been processed, the application program generates a confirmation message in which the class specified during the generation of the application object to be processed is specified as a class identifier, the confirmation message subsequently can be processed by the interface program. For example, when the interface program is processed, it is possible to determine by reference to the class identifier which data are to be removed from the confirmation message. To do this, the table used in the interface program is expanded to such an extent that entries to the permitted data are also associated with each class identifier. The interface program then generates from the confirmation message a new confirmation message which contains only such data of an application object of the class to which the confirmation message refers.

The class specified when the application object to be processed is generated is stored in one embodiment as an origin class in the data of the application object to be processed. When the application program is processed, the origin class is then used as a class identifier. This procedure makes the origin class available easily.

If, in another embodiment, the confirmation message also contains an auxiliary identifier in which at least one class is designated which is known in the service computer and/or in at least one other service computer as the class to which the application object to be processed belongs, the program in the service computer can determine later, by reference to the auxiliary identifier, how the received confirmation message is to be processed. This is significant, in particular, if the class specified in the class identifier of the confirmation message received by the service computer is not yet known in the service computer. The service computer then determines the class to which the confirmation message refers by reference to the class or classes specified in the auxiliary identifier. The auxiliary identifier contains, in other words, the classes with respect to which the application object is allomorphous. If the confirmation message contains not only the class identifier but also an origin identifier in which the origin class is specified, the requirements of the protocol for the exchange of messages in the control computer and also for the protocol for the exchange of messages between the service computer and control computer can be fulfilled.

In another embodiment, at least one class which is known in the service computer and/or in at least one other service computer for the application object is stored as an allomorph class in the data of the application object. When the application program is processed, the allomorph class is then used as an auxiliary identifier. This measure results in an easy-to-manage data structure in which the application objects administer their allomorph classes themselves. It is not necessary to take any additional measures with respect to the allomorph class in the interface program or in the application program.

In another embodiment, the interface program is also responsible for other interface functions. For example, for the control of events for defining the processing sequence of the maintenance messages or for protocol adaptations of these messages, referred to in English as "basic encoding". As a result of this measure, on the control computer there is just a single interface program which is programmed and maintained in a standardized fashion.

Additional features and advantages of the present invention are described in, and will be apparent from, the following detailed description of the invention and the figures.

DETAILED DESCRIPTION OF THE INVENTION

Figure 1:
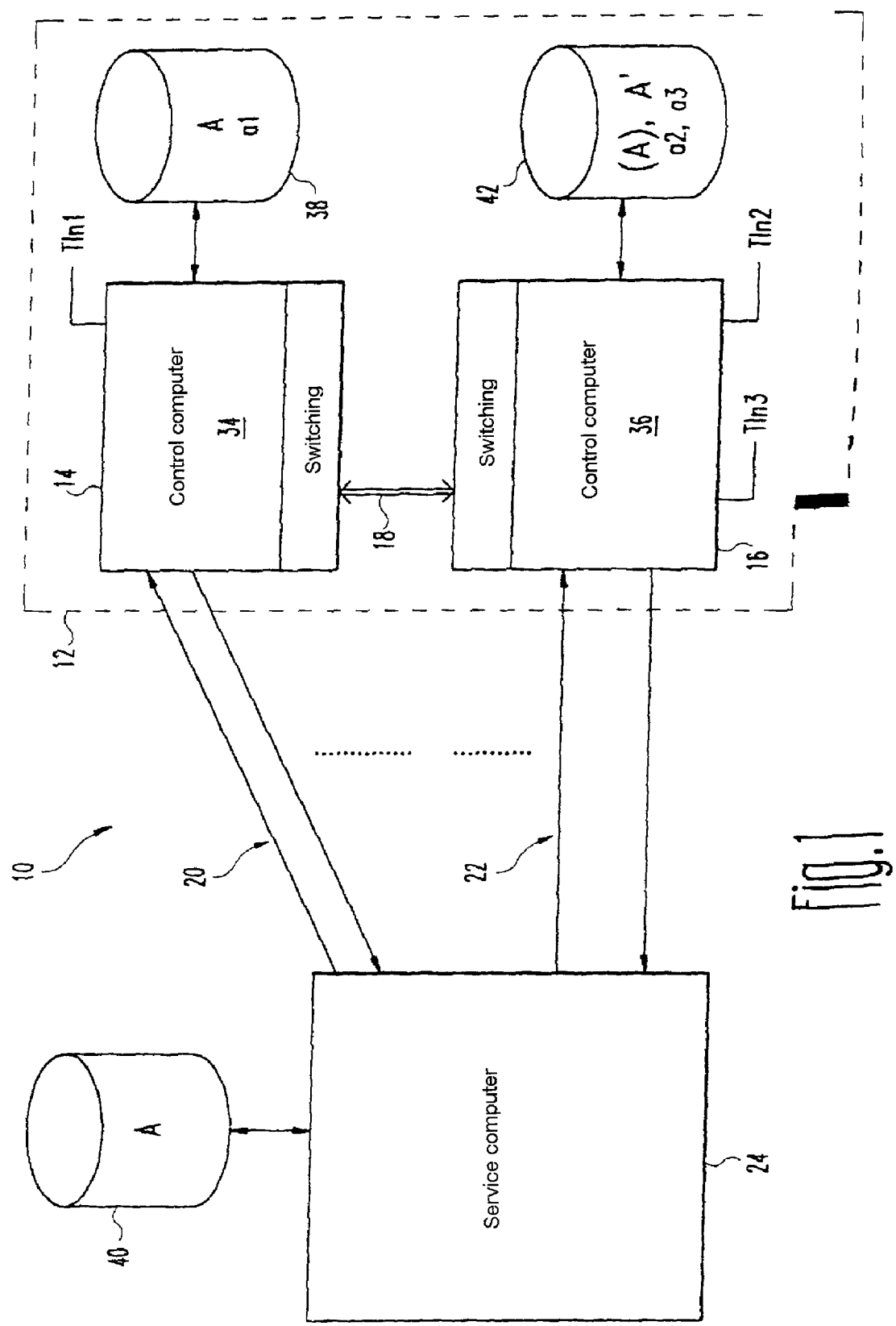
FIG. 1 shows part of a control network for controlling a telecommunications network.

FIG. 1 shows part of a control network 10 for controlling a telecommunications network 12. The telecommunications network 12 contains a multiplicity of switching offices, of which the switching offices 14 and 16 are illustrated in FIG. 1. The telecommunications network 12 also includes connecting lines between the switching offices, of which a connecting line 18 between the switching office 14 and the switching office 16 is illustrated in FIG. 1. The telecommunications network 12 connects the subscribers of the telecommunications network 12; for example, a subscriber Tln1 connected to the switching office 14 and a subscriber Tln2 connected to the switching office 16.

The control network 10 contains dedicated transmission links 20 and 22 which lead to a service computer 24. The transmission link 20 transmits maintenance messages from the service computer 24 to the switching office 14 in order, for example, to change subscriber data of the subscriber Tln1 in the switching office 14. The switching office 14 itself transmits confirmation messages to the service computer 24 in order to signal satisfactory processing of the received maintenance message. The transmission link 22 serves for bidirectional transmission of data between the service computer 24 and switching office 16.

The maintenance messages are processed in the switching office 14 by a control computer 34 and in the switching office 16 by a control computer 36. The data structures to which the maintenance messages refer belong to the same class A in the service computer 24 and in the switching office 14. The switching office 16 on the other hand contains data structures of a class A', which have been developed in comparison with the class A required in the service computer 24. Error-free operation of the control network 10 is ensured with respect to the switching office 16 by virtue of the fact that allomorphy has been taken into consideration in the development of the class A into class A'. What allomorphy refers to in this context is explained below with reference to FIG. 2.

In the exemplary embodiment illustrated in FIG. 1, the class A which defines, for example, the data structure of the subscriber data, for example the call number and the useable services of the telecommunications network 12, is used in the switching office 14. The subscriber data of the subscriber Tln1 is stored in an object a1 in accordance with the data structure predefined by the class A in a memory 38 of the control computer 34. The class A is also known in the service computer 24, indicated by the letter A in a memory 40 of the service computer 24.

In the switching office 16, the class A was developed into the class A'. An object a2 contains, for example, the subscriber data of the subscriber Tln2. The object a2 was firstly stored in the memory 42 before the class A was developed into the class A'. However, in the development, the original object a2 was converted, specifically into an expanded object a2 of the class A' by supplementing a data field. An object a3 in the memory 42 belongs to the class A' and contains the subscriber data of a subscriber Tln3 whose connection was not set up in the switching office 16 until after the development. Although the programs in the service computer 24 only support objects of the class A, the objects a2 and a3 belonging to the class A' can be interrogated, amended or newly set up as objects of the class A from the service computer 24. The expansions of the class A', in comparison to the class A cannot, however, be processed by the service computer 24 until the programs in the service computer 24 have been amended at a later time in such a way that the class A' is also known in the service computer 24.

Figure 2:
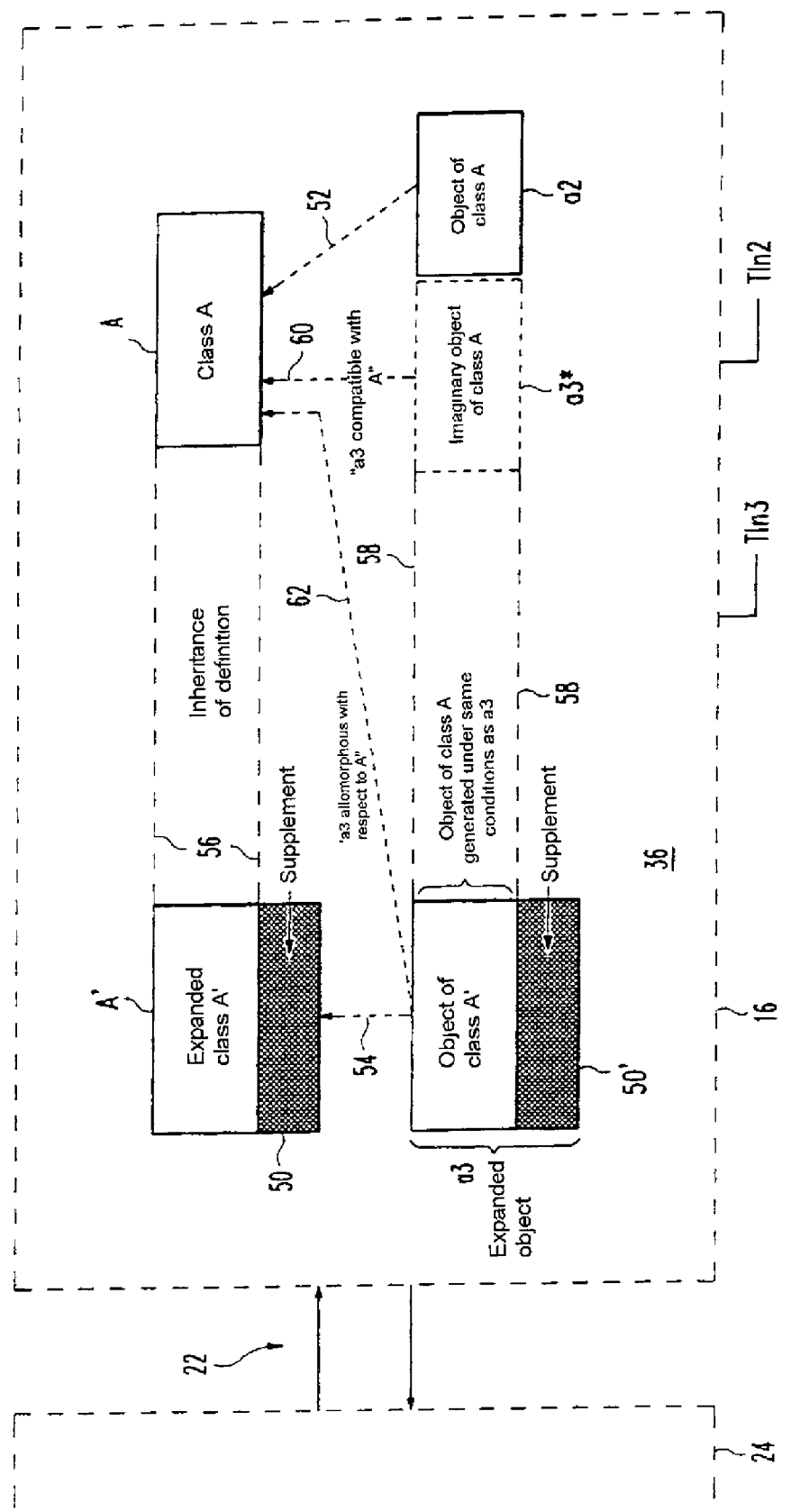
FIG. 2 shows the development of an original class A into an expanded class A', whose objects can be controlled as objects of the old class A during the operation of the control network.

FIG. 2 shows the classes A and A' and the original object a2 and the object a3. Below, the meaning of the designation "allomorphous with respect to" is explained in conjunction with FIG. 2. The class A' differs from the class A only by having an additional data field 50. The data structure of the class A has therefore been expanded by the data field 50 in order to be able to take into consideration a further property of the subscribers Tln2, Tln3 during the operation of the switching office 16; for example, whether the subscriber Tln2, Tln3 is connected to the switching office 16 via an optical waveguide or via a copper conductor. For this reason, the class A' is also designated below as an expanded class A'. A data field 50' in the object a3 contains, as data item, a value which indicates that the subscriber Tln3 is connected to the switching office 16 via an optical waveguide. The object a3 is generally designated as an expanded object a3.

The class which is specified when an object is generated is designated as an original class of this object. The object a2 had, as original class, the class A indicated by an arrow 52. On the other hand, the expanded object a3 has, as original class, the expanded class A' indicated by an arrow 54.

A first possible way of defining the data structure of the class A includes generating the class A' from the class A via what is referred to as inheritance which is defined in object-oriented programming languages. Such programming languages are, for example, the languages C++ and CHILL. When inheritance occurs, the programmer specifies that the expanded class A' is to take over all the data structures and what are referred to as methods for processing the data structures from the class A. It is also specified that the class A' additionally contains the data field 50. Another possible way of defining the class A' is to redefine this class. In this case, the class A' is defined in the way in which it was already defined in class A. However, in addition, the data field 50 is also defined. The relationship between the corresponding parts of class A and of the expanded class A' is illustrated in FIG. 2 via dashed lines 56.

An imaginary object a3* contains, from the object a3, all the data fields and all the methods for processing the data fields which also would have been generated when the subscriber Tln3 is set up before the development, when the class A existed, but the class A' did not yet exist. In the object a3*, there is for this reason no data field corresponding to the data field 50 or 50'. This fact is indicated by dashed lines 58. The object a3* is a visual aid for delimiting the terms "compatible with" and "allomorphous with respect to". An arrow 60 indicates that the object a3* is compatible with the class A because it has precisely the data structures which are predefined in the class A. The expanded object a3 is on the other hand allomorphous with respect to the class A, cf. arrow 62. The object a3 has the allomorphous class A.

Allomorphy is the ability of the objects in class A' to be controlled as if they were objects of their allomorphous class A if this ability arises as a result of measures on the part of the application program. In an incremental expansion it is possible for there to be more than one allomorphous class; for example, the allomorphous class of the last expansion and the allomorphous class of the penultimate expansion.

An expanded object has only one allomorphous class if the expanded object is compatible in accordance with standard X.720 section 5.2.2 without the expansions to form the allomorphous class. In particular, the expanded object accordingly has all the attributes, attribute groups, control functions and confirmation methods which are also defined in the allomorphous class. Making allowance for allomorphy in the expansion of the class A ensures that the control network 10 also operates without errors after the expansion.

Figure 3:
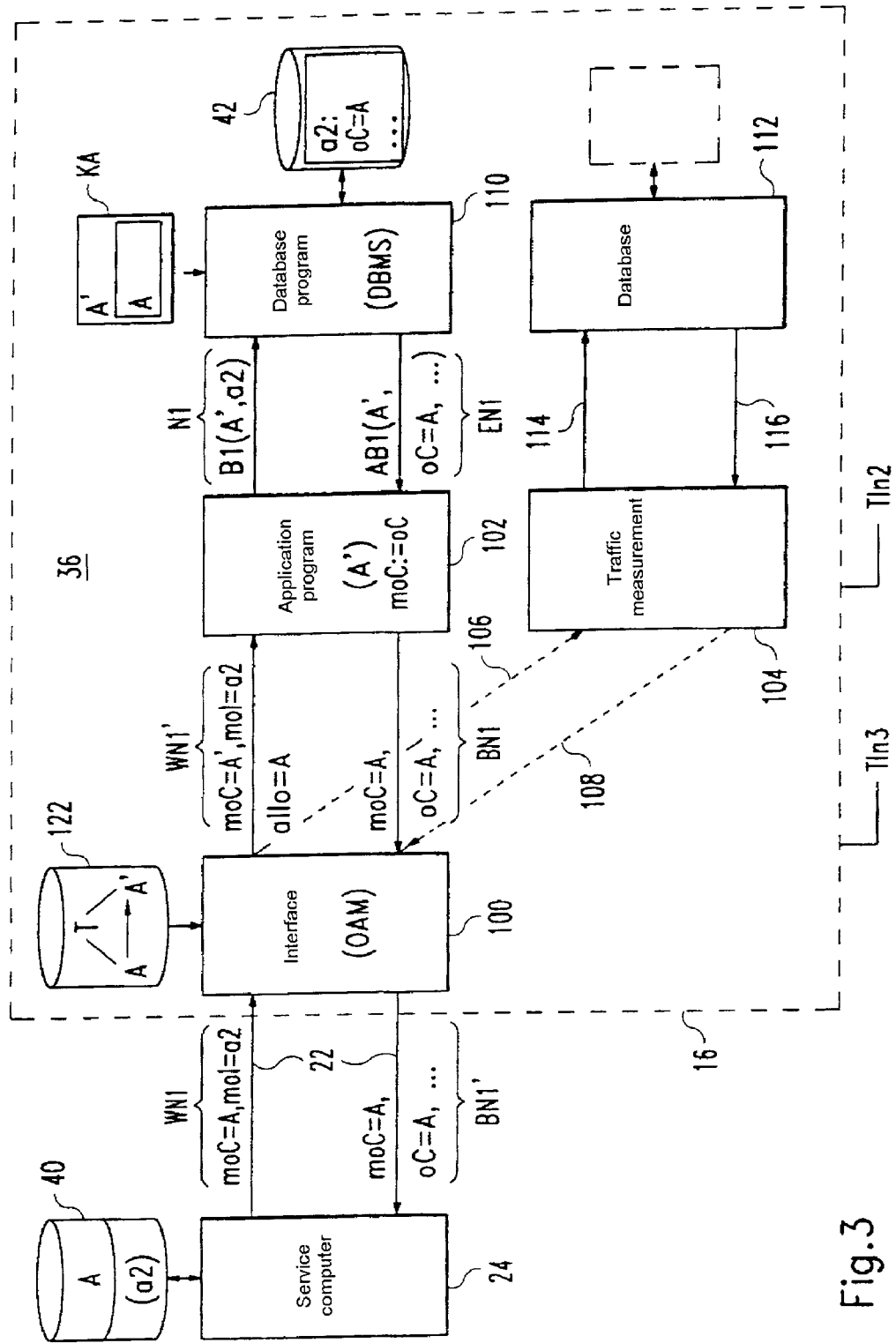
FIG. 3 shows the processing of messages in the control computer of a switching unit after the development, an object being controlled which has been generated before the development.

FIG. 3 shows the processing of messages in the control computer 16 after the development of the class A into the class A', the object a2 which has been configured before the development as belonging to the class A being controlled. During the development of the class A into the class A', allomorphy was taken into account so that objects of the class A' are allomorphous with respect to the class A. In addition, in the development all the objects of the class A were converted into objects of the class A' through supplementing data fields and methods.

The control computer 16 contains an interface program 100 which processes maintenance messages coming from the service computer 24, for example a maintenance message WN1, and which transmits confirmation messages, for example a confirmation message BN1', to the service computer 24. The interface program 100 is the interface between the service computer 24 and a number of application programs in the control computer 16, of which two application programs 102 and 104 are shown in FIG. 3. The application program 102 serves to administer the data associated with the subscribers Tln2, Tln3 connected to the switching office 16. The application program 104 is used for traffic measurement.

The maintenance message WN1 coming from the service computer is passed on, as amended maintenance message WN1', to the application program 102 when the interface program 100 is processed. On the other hand, maintenance messages which are intended for the application program 104 are passed on to the application program 104, cf. arrow 106, when the interface program 100 is processed.

After the processing of the maintenance message WN1' in the application program 102, the application program 102 generates a confirmation message BN1 for the interface 100. If the application program 104 has processed a maintenance message, it also transmits a confirmation message to the interface program 100, cf. arrow 108.

During the processing of the maintenance message WN1', the application program 102 cooperates with a database program 110 which is also present in the control computer 36 and is used to store, change, delete or read subscriber data in the memory 42. The application program 102 transmits requests in the form of messages to the database program 110; for example, the message N1. After the request in the message N1 has been executed, the database program 110 transmits a result message EN1 back to the application program 102. The application program 104 cooperates with its own database program 112 by transmitting requests to the database program 112, cf. arrow 114, and by receiving and further processing result messages from the database program 112, cf arrow 116.

The database program 110 uses the same access method for the objects of the original class A and the objects of the developed class A'. This is possible because combination classes are used in which the data structures and methods of the original class and of the expanded class are combined. A combination class KA is the combination of the class A and of the class A'. All the objects in the memory 42 which have the allomorphous class A as original class are expanded during the development by the additional data fields of the expanded class A. The additional data fields are filled with predefined values.

The maintenance message WN1 contains a class identifier moC which specifies the class A as the class to which the maintenance message WN1 refers. An object identifier moI specifies the object a2 to which the maintenance message WN1 refers. The maintenance message WN1 is transmitted by the service computer 24 in order to find out the subscriber data of the subscriber Tln2. All that is known in the service computer 24 is that this subscriber data is contained in the object a2 which is stored in the control computer 36. The maintenance message WN1 contains further data fields which are not illustrated. The read operation to be carried out, for example, is defined in one of these data fields.

When the maintenance message WN1 is processed in the interface program 100, the class A specified in the class identifier moC is determined. When the interface program 100 is processed, the class A' is determined as an alternative class via a table T by reference to the class A which is determined in this way, and the class A' is entered into the class identifier moC of the maintenance message WN1. The table T is stored in a memory 122 of the control computer 36.

The maintenance message WN1' relates, with the class identifier moC=A', to the expanded class A'. The value of the object identifier moI=a2 remains unchanged in the maintenance message WN1'. An identifier allo in the maintenance message WN1' specifies all the classes which are allomorphous with respect to the class A', i.e. in the exemplary embodiment the class A. The interface program 100 also obtains these classes from the table T. The other data of the maintenance message WN1 are transferred into the maintenance message WN1'. When the maintenance message WN1' belonging to the maintenance message WN1 is generated, the interface program 100 also carries out protocol adaptation of a transmission protocol on the transmission link 22 into a message protocol which is used within the control computer 36.

The message N1 which is generated by the application program 102 during the processing of the maintenance message WN1' contains an instruction B1 which specifies that data is to be read. As a parameter of the instruction B1, the message N1 contains the class A' to which the data to be read belongs, as well as the object a2 whose data is to be read. The application program 102 processes exclusively messages which refer to objects of the class A'. No further measures are taken in the application program 102 with respect to the class A.

The database program 110 accesses the memory 42 during the processing of the message N1 in order to read the data of the subscriber Tln2 which is stored in the object a2. The object a2 also contains an origin identifier oC in which the class which has been specified when the object a2 was generated is specified. The database program 110 reads the data requested with the instruction B1 in the object a2 and enters this data into the result message EN1. In addition, in the result message EN1 there is a note, via a response identifier AB1, that the result message EN1 contains the result which has been generated when the instruction BI was processed.

Furthermore, in the result message EN1 the class A' is specified as the class which has been affected by the result message EN1. The origin identifier oC=A is also transferred from the database program 110 in the result message EN1 to the application program 102.

When the application program 102 is processed it is a prerequisite that all the messages to be processed refer to the class A' and not to the class A. The value of the origin identifier oC=A is transferred as a value of the class identifier moC in the confirmation message BN1 by the application program 102. For this value assignment it is not necessary for the application program 102 to be able to process objects of the class A. In addition, the confirmation message BN1 contains the origin identifier oC=A and the interrogated subscriber data of the subscriber Tln2. The interface program 100 does not need to remember the class identifier of the maintenance message WN1 by virtue of this procedure.

The confirmation message BN1 is processed by the interface program 100 and transmitted, as confirmation message BN1', to the service computer 24 on the transmission link 22 in accordance with the transmission protocol. By reference to the table T, the interface program 100 determines which data fields in the message BN1 are not contained in objects of the class A. These data fields are not transferred into the confirmation message BN1'.

The service computer 24 receives the confirmation message BN1' and can process it as a message which refers to an object of the class A. Objects of the class A' in the control computer 36 are controlled from the service computer 24 as if they were objects of the class A. The development in the control computer 36 does not, therefore, restrict the operating features of the service computer 24.

Figure 4:
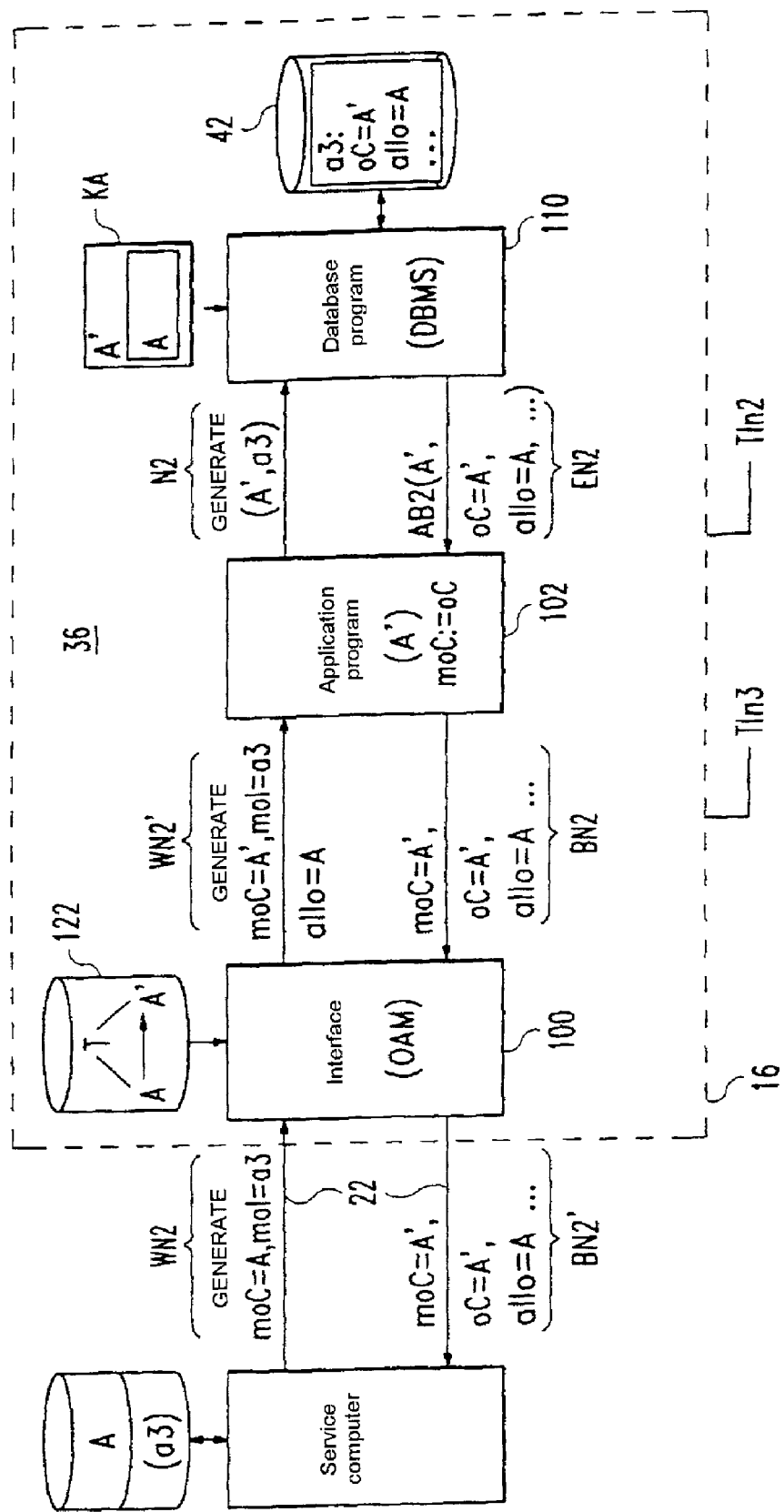
FIG. 4 shows the processing of messages in the control computer after the development, an object being controlled which has been generated after the development.

FIG. 4 shows the processing of messages in the control computer 16 after the development of the class A into the class A', the object a3 which is not generated until after the development being controlled.

Via inputs by an operator into the service computer 24, a maintenance message WN2 is generated in the service computer 24, the maintenance message WN2 having the function of generating in the control computer 16 the object a3 for the subscriber data of the subscriber Tln3. For this reason, the maintenance message WN2 contains a coding for the instruction "Generate" in an instruction field. The class identifier moC in the maintenance message WN2 identifies the class A as the class to which the maintenance message WN2 refers. The object identifier moI of the maintenance message WN2 identifies the object a3 which is to be generated via the maintenance message WN2. The maintenance message WN2 also contains further data which is not illustrated.

The interface program 100 processes the maintenance message WN2 in the same way as explained above for the maintenance message WN1. When the maintenance message WN2 is processed, the table T stored in the memory 122 is again used to determine the alternative class A' for the class A specified in the class identifier moC of the maintenance message WN2 and to use it as the class identifier moC of the maintenance message WN2'. The object identifier moI=a3 has the same value in the maintenance message WN2' as in the maintenance message WN2. The remaining data is also transferred from the maintenance message WN2 into the maintenance message WN2' when the interface program 100 is executed. In addition, in the identifier alloI of the maintenance message WN2', it is noted that the class A is the class with respect to which the class A' is allomorphous. The maintenance message WN2' generated in this way is transmitted from the interface program 100 to the application program 102 in accordance with the protocol in the control computer 36.

When the maintenance message WN2' is processed, the application program 102 transmits a message N2 to the database program 110 in order to allow the object a3 to be created in the memory 42. The message N2 contains, in encrypted form, the instruction "Generate", the expanded class A' and the name of the object a3 to be created.

When the message N2 is processed, the object a3 is generated in the memory 42 via the database program 110 by assigning to this object specific memory cells which are filled with initial values. In the origin identifier oC of the object a3 there is a note of the class A' because this class was specified when the object a3' was generated. An identifier alloI in the object a3 refers to the class A because the object a3 is allomorphous with respect to the class A.

The database program 110 generates a result message EN2 in order to confirm the generation of the object a3. The result message EN2 contains a response identifier AB2 which specifies that the result message EN2 was produced when an instruction "Generate" was produced. In addition, the result message EN2 contains an identifier which refers to the class A', the origin identifier oC=A', the identifier alloI=A and further data (not illustrated) of the object a3.

The result message EN2 is processed by the application program 102, a confirmation message BN2 being generated. The value of the origin identifier oC=A' is used as a value of the class identifier moC in the confirmation message BN2.

The other data items in the result message EN2 are transferred into the confirmation message BN2.

When the interface program 100 is processed, after the reception of the confirmation message BN2, a confirmation message BN2' is generated in accordance with the transmission protocol used on the transmission link 22. The confirmation message BN2' contains all the data of the confirmation message BN2 because the interface program 100 determines, by reference to the table T, that it is not necessary to remove any data fields if the confirmation message BN2 has the class A' as class identifier.

During the processing of the confirmation message BN2' in the service computer 24, it is determined by reference to the identifier alloI that the confirmation message BN2' relates to data of an object of the class A or that the confirmation message BN2' can be treated as if it contained data of an object of the class A. Although the program in the service computer 24 has not been changed after development in the control computer 36, objects of the class A' in the control computer 36 can be controlled from the control computer 24 as if they were objects of the class A. As long as only the class A is known in the service computer A, it is also the case that only the data items contained in objects of the class A are processed in the confirmation message BN2'.

Via the method explained with reference to FIGS. 3 and 4, it is also possible to support classes which are allomorphous with respect to a number of classes. If, for example, the class A' is developed into a class A", objects can be allomorphous with respect to the classes A' and A. The control computer 36 then can be executed by service computers 24 during whose programming at least one of the classes A, A' or A" was known. It is possible to dispense with the class A as soon as all the service computers know at least the class A'.

The method explained with reference to FIGS. 3 and 4 is applied in maintenance messages for generating objects, and in maintenance messages for reading objects. In addition, this method can be used to change data in objects and delete objects. For these methods to operate without errors, the service computer 24 must be capable:

of assigning the confirmation messages BN to the associated maintenance messages WN, of reading and evaluating the identifier alto in the confirmation messages BN, of skipping over unknown name associations (cf. explanations relating to FIG. 5) and unknown identifier values and parameters, of storing the origin class of an object if there is a database in the service computer, of skipping over unknown optional values, and of skipping over unknown values of the "enumerated" data type.

In other words, the service computer 24 must be programmed in such a way that objects can be transferred from it into a control computer with a greater degree of knowledge.

The interface program 100 has the following features:

When a class is expanded it is necessary to incorporate the expanded class into the table T, such that for each expanded class it is necessary to store the classes with respect to which the expanded class is allomorphous.

The name associations which have been made by the expanded class must be stored in the table T.

The interface program 100 is to remove from the confirmation messages BN coming from the application program 102 the data which does not belong to the compatible class if the confirmation message BN transmitted to the service computer 24 does not relate to the non-expanded class.

The interface program 100 must be able to process filter instructions. This is explained in more detail below with reference to FIG. 5.

The application program 102 fulfills the following requirements:

As soon as the system moves over to the expanded class, only objects of the new class are then generated, irrespective of the knowledge of the service computer.

The new classes are either expanded classes or classes which have nothing to do with the previous classes.

The database program 110 is configured in such a way that, after a development, the entire data stock relating to the origin class is converted into a data stock of the expanded class.

The creation of the table T and the conversion of the data stock in the database of the database program 110 are supported by service programs. These service programs evaluate description languages which are used to specify the expansion of classes.

Conditions which have to be complied with when taking into consideration allomorphy are dealt with below. These conditions apply on the level of the classes although, according to standard X.720, allomorphy is firstly a property of an object. In the standard X.720, the following conditions are mentioned:

conditions for the expanded class in section 5.2.2.1,
conditions for what are referred to as program packages in the sections 5.2.2.1 and 5.2.2.2,
conditions for identifier values in the sections 5.2.2.3 and 5.3.4.1,
conditions for what are referred to as identifier groups in section 5.2.2.4,
conditions for actions, confirmations and parameters in section 5.2.2.54,
conditions for the behavior of the objects in section 5.2.2.6, and
conditions for the name association in section 5.3.4.1.

Figure 5:
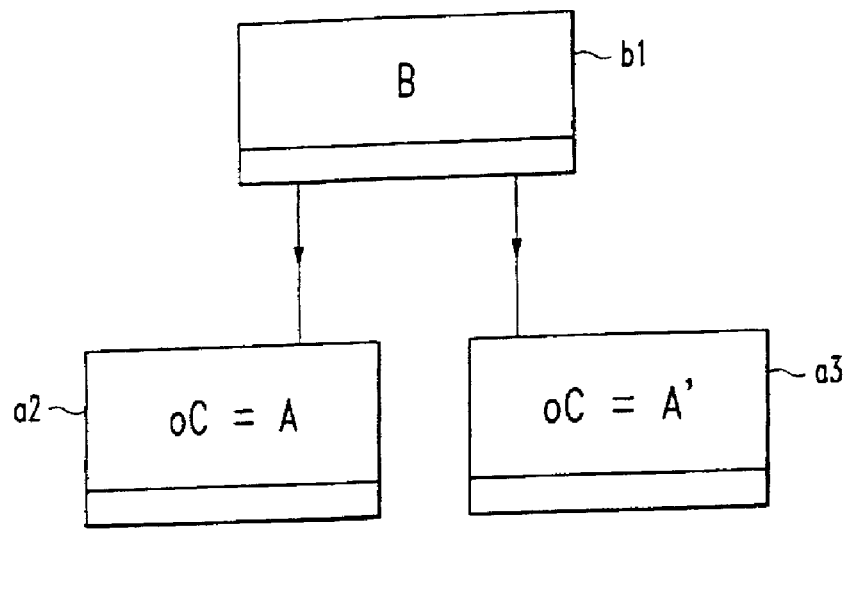
FIG. 5 shows the association of the names of classes A and A1 and an access to objects of the two classes via a filter function.
Figure 5:
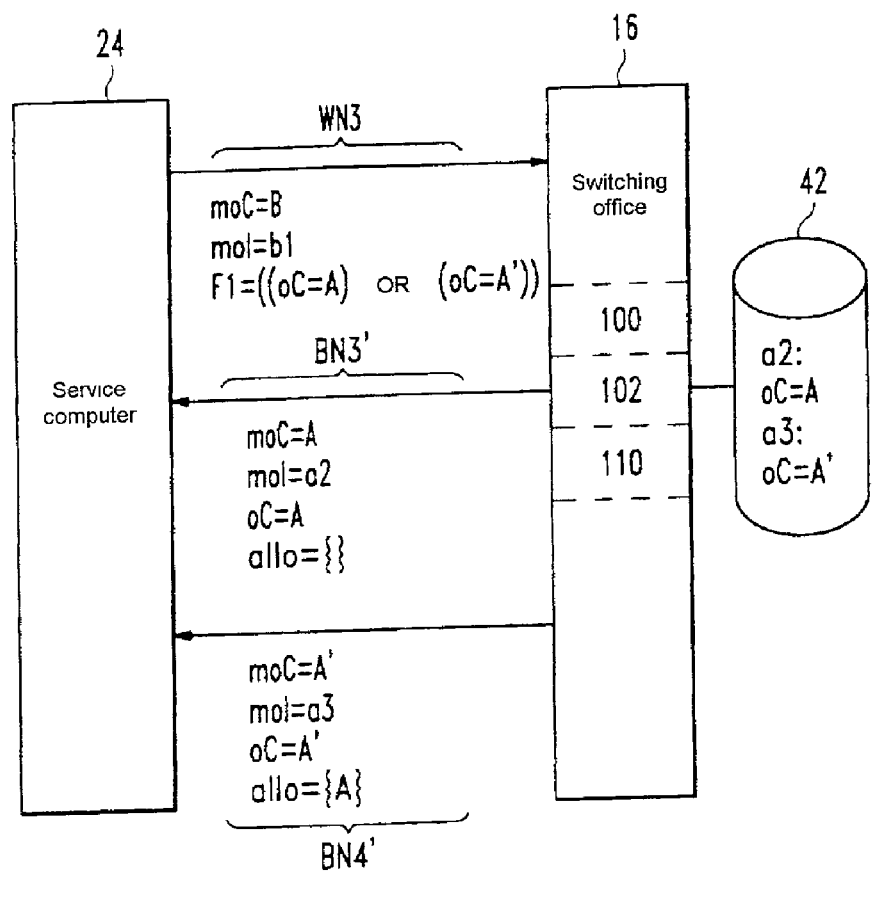

FIG. 5 shows, in a part a, a section of what is referred to as a binary tree which defines the name association of objects of the class A and A'. Name association is the assignment of the object to what is referred to as a superordinate object, the assignment being used for the definition of a uniquely defined name for an object. Identical object names for different objects can be used if the objects each belong to another superordinate object. A name which is uniquely defined in the control computer 16 is then produced from the name of the superordinate object and the name of the objects which are subordinated in this way. The superordinate object is to be specified when an object is generated. The subordinate object is considered as being contained in the superordinate object, referred to in English as "containment".

An object b1 of the class B is the superordinate object for the objects a2 and a3, which both belong to the class A' after the development, but have different original classes oC=A and oC=A'. The name associations are noted in the table T which is used by the interface program 100.

For the portion of the name tree shown in part A of FIG. 5 there is a note in table T that objects of the class B contain subordinate objects of the original class A and of the class A'. At each development, the name associations in the table T are also adapted to the name tree which is also decisive after the development.

In part b of FIG. 5, an access to objects of both classes A and A' is illustrated after the service computer 24 also knows both classes A and A'. A maintenance message WN3 contains a filter instruction F1=((oC=A) OR (oC=A')) in which it is defined that subordinate objects of the class A or A' are to be registered. The class identifier moC=B of the maintenance message WN3 specifies that the maintenance message WN3 also refers to the class B. The object identifier moI=b1 of the maintenance message WN3 specifies that the object b1 is to be processed; i.e., is the superordinate object.

When the interface program 100 is executed in the switching office 16, the filter instruction F1 is transmitted unchanged to the application program 102. As such in particular, that operations which refer to the original class A do not have to be replaced in the filter instruction F 1 by operations which refer to the expanded class A'. This measure ensures that the service computer 24 can distinguish between objects of the original class A and of the original class A'.

The application program 102 causes the data of the objects a2 and a3 whose original class is the class A and A', respectively, to be read from the memory 42 via database program 110. Two confirmation messages BN3 and BN4 (not illustrated) are transmitted to the interface program 100. A new confirmation message BN3', which contains the class identifier moC=A, the object identifier moI=a2, the origin identifier oC=A and the auxiliary identifier allo={ } is generated from the confirmation message BN3 in the interface program 100. A confirmation message BN4', which contains the class identifier moC=A', the object identifier moI=a3, the origin identifier oC=A' and the auxiliary identifier allo={A} is generated from the confirmation message BN4 in the interface program 100.

The CCITT standard X.734 "Information Technology— Open Systems Interconnection—Systems Management: Event Report Management Function" from 1993 explains event control in the control network 10, cf. FIG. 1. What are referred to as discriminators are used which pass on events to the service computer 24 within the switching office 16 only under certain conditions. After the development of the class A into the class A', it is sufficient to convert the discriminators which relate to the class A into discriminators which relate to the class A'. If new discriminators are generated after the development, the class A is replaced by the class A' if the class A is specified as a selection criterion for the passing on of the messages.

Although the present invention has been described with reference to specific embodiments, those of skill in the art will recognize that changes may be made thereto without departing from the spirit and scope of the invention as set forth in the hereafter appended claims.

The invention claimed is:

1. A method for operating a telecommunications network, the method comprising the steps of:
controlling a network element at a network node of the telecommunications network via a control computer;
storing at least one interface program and a plurality of application programs in the control computer in addition to an operating system;
processing application objects during execution of the application programs, the application projects having, depending on their membership of a class, data with a predefined data structure and predefined methods for processing the data;
setting up a link between a service computer and a control computer;

maintenance being performed on the control computer via the link by at least one maintenance message;

processing the maintenance messages, via the interface program, coming from the service computer, each of the maintenance messages containing a class identifier which assigns the maintenance message to a class, the class identifier specifying the class, known in the service computer, of an application object to be processed;

determining an alternative identifier, when the interface program is processed with reference to the class identifier, which indicates an alternative class to which the application object to be processed belongs in the network element, the alternative identifier being incorporated into an amended maintenance message;

storing at least one class known in at least one service computer for the application object as an allomorph class in the data of the application object;

using the allomorph class as an auxiliary identifier when the application program is processed; and processing the amended maintenance message, wherein the application object to be processed is processed as an object of the alternative class by an application program.

2. A method for operating a telecommunications network as claimed in claim 1, wherein when the alternative identifier is determined, a first table stored in a memory of the control computer is used, in which table the alternative identifier is assigned to the class identifier.

3. A method for operating a telecommunications network as claimed in claim 1, the method further comprising the step of:

generating a confirmation message, via the application program and after the processing of the amended maintenance message, in which the class specified when the application object to be processed to be generated is specified.

4. A method for operating a telecommunications network as claimed in claim 3, the method further comprising the steps of:

generating an amended confirmation message from the confirmation message, when the interface program is processed, the amended confirmation message containing only data which has an application object of the class to which the confirmation message relays; and transmitting the amended confirmation message to the service computer.

5. A method for operating a telecommunications network as claimed in claim 3, the method further comprising the steps of:

storing the class specified, when the application object to be processed is generated, as an origin class in the data of the application object to be processed; and using the origin class as a class identifier when the application program is processed.

6. A method for operating a telecommunications network as claimed in claim 3 wherein the confirmation message contains an identifier in which at least one class is designated which is known in the service computer as the class to which the application object to be processed belongs.

7. A method for operating a telecommunications network as claimed in claim 6, wherein the confirmation message contains, in addition to the class identifier, an origin identifier in which the origin class is specified.

8. A method for operating a telecommunications network as claimed in claim 4, wherein a confirmation message which is generated for the service computer when the interface program is being processed contains the class identifier and the origin identifier, and possibly an identifier in which at least one class is designated.

9. A method for operating a telecommunications network as claimed in claim 1, wherein the network element is selected from the group consisting of a switching office, a cross-connector and a concentrator unit.

10. A method for operating a telecommunications network as claimed in claim 1, wherein the telecommunications network is selected from the group consisting of a fixed network, a mobile radio network, and a network with a fixed network component and a mobile radio network component.

11. A method for operating a telecommunications network as claimed in claim 1, wherein the interface program carries out further interface functions between the service computer and the application programs, including at least one of an events control for defining a processing sequence of the maintenance messages, and adaptation of the messages coming from the service computer to a protocol for transmitting messages within the control computer, and an adaptation of the confirmation messages coming from the application programs to a predefined protocol for transmitting messages between the service computer and the control computer.

12. A method for operating a telecommunications network as claimed in claim 1, the method further comprising at least one of the following steps: using a first application program for subscriber administration;

using a second application program for administering connecting lines to other switching devices;

using a third application program for performing maintenance on the switching devices; and using a fourth application program for measuring traffic on the switched links.

13. A method for operating a telecommunications network as claimed in claim 12, wherein the application objects of the first application program contain the subscriber data for one subscriber in each case.

14. A method for operating a telecommunications network as claimed in claim 1, wherein the maintenance messages contain a name identifier for a name of the application object to which the maintenance message relays.

15. A network element for operating a telecommunications network, comprising:

a control computer for controlling the network element, at least one interface program and a plurality of application programs being stored in the control computer in addition to an operating system, application objects being processed during execution of the application programs, the application objects having, depending on their membership of a class, data with a predefined data structure and predefined methods for processing the data; and a service computer connected to the control computer via a link, maintenance being performed on the control computer by at least one maintenance message, the interface program processing the maintenance message is coming from the service computer, each of the maintenance messages containing a class identifier which assigns the maintenance message to a class, the class identifier of the maintenance message specifying the class as an allomorph class in the data of the application object, known in the service computer, of an application object to be processed, when the interface program is processed with reference to the class identifier an alternative identifier is determined according to the allomorph class which indicates an alternative class to which the application object to be processed belongs in the network element, the alternative identifier being incorporated into an amended maintenance message, and when the amended maintenance message is processed, the application object to be processed is processed as an object of the alternative class by an application program.

16. A telecommunications network comprising a plurality of network elements, wherein at least one of the plurality of network elements is for operating the telecommunications network, the network elements comprising:
   a control computer for controlling the network element, at least one interface program and a plurality of application programs being stored in the control computer in addition to an operating system, application objects being processed during execution of the application programs, the application objects having, depending on their membership of a class, data with a predefined data structure and predefined methods for processing the data; and
   a service computer connected to the control computer via a link, maintenance being performed on the control computer by at least one maintenance message, the interface program processing the maintenance message is coming from the service computer, each of the maintenance messages containing a class identifier which assigns the maintenance message to a class, the class identifier of the maintenance message specifying the class as an allomorph class in the data of the application object, known in the service computer, of an application object to be processed, when the interface program is processed with reference to the class identifier an alternative identifier is determined according to the allomorph class which indicates an alternative class to which the application object to be processed belongs in the network element, the alternative identifier being incorporated into an amended maintenance message, and when the amended maintenance message is processed, the application object to be processed is processed as an object of the alternative class by an application program.

* * * * *